US012801672B2

(12) United States Patent
Gupta et al.

(10) Patent No.: US 12,801,672 B2
(45) Date of Patent: Nov. 17, 2026

(54) METHOD AND APPARATUS FOR PROVIDING APPROPRIATE ALTERNATE RECEIVER TO PERFORM INPUT EVENTS IN IOT ENVIRONMENT

(71) Applicant: Samsung Electronics Co., Ltd., Suwon-si (KR)

(72) Inventors: Atul Gupta, Noida (IN); Manali Arora, Delhi (IN); Shreya Bharti, Ghaziabad (IN); Manas Ranjan Sahoo, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 18/973,888

(22) Filed: Dec. 9, 2024

(65) Prior Publication Data

US 2025/0103659 A1 Mar. 27, 2025

Related U.S. Application Data

(63) Continuation of application No. PCT/KR2023/004378, filed on Mar. 31, 2023.

(51) Int. Cl.

| | |
|---|---|
| ***G06F 16/90*** | (2019.01) |
| ***G06F 16/906*** | (2019.01) |
| ***G06F 16/908*** | (2019.01) |
| *G16Y 20/10* | (2020.01) |

(52) U.S. Cl.

CPC .......... *G06F 16/906* (2019.01); *G06F 16/908* (2019.01); *G16Y 20/10* (2020.01)

(58) Field of Classification Search

CPC .......................... G06F 16/906; G06F 16/908
See application file for complete search history.

(56) References Cited

U.S. PATENT DOCUMENTS

| | | | |
|---|---|---|---|
| 8,045,543 | B2 | 10/2011 | Camp, Jr. et al. |
| 8,467,515 | B2 | 6/2013 | Czachor, Jr. et al. |
| 9,049,293 | B2 | 6/2015 | Chavez et al. |

(Continued)

FOREIGN PATENT DOCUMENTS

| | | | |
|---|---|---|---|
| CN | 110662187 | A | 1/2020 |
| KR | 10-2308814 | B1 | 10/2021 |
| KR | 10-2681530 | B1 | 7/2024 |

OTHER PUBLICATIONS

Yonatan, Reuben, What is Intelligent Call Routing & How Does it Work, Jun. 2020, https://getvoip.com/blog/intelligent-call-routing/.

(Continued)

*Primary Examiner* — Kristopher Andersen
(74) *Attorney, Agent, or Firm* — Jefferson IP Law, LLP

(57) ABSTRACT

A method performed by an electronic device for providing an appropriate alternate receiver to perform one or more input events in an Internet of Things (IOT) environment is provided. The method includes performing one or more actions including determining essentiality and classifying the one or more input events and determining expected response for the one or more input events, determining current availability of a receiver for the one or more input events, predicting response of the receiver to the one or more input events, based on current availability of the receiver with respect to the expected response.

20 Claims, 11 Drawing Sheets

(56) References Cited

U.S. PATENT DOCUMENTS

| | | | |
|---|---|---|---|
| 9,083,804 | B2 | 7/2015 | Conway et al. |
| 9,241,073 | B1 | 1/2016 | Van Rensburg et al. |
| 9,621,721 | B2 | 4/2017 | Erb |
| 10,051,068 | B2 | 8/2018 | Sharma et al. |
| 10,482,756 | B2 | 11/2019 | Kumar et al. |
| 10,491,748 | B1 | 11/2019 | Wu et al. |
| 10,574,825 | B2 | 2/2020 | Barak et al. |
| 10,582,062 | B2 | 3/2020 | Li |
| 10,885,917 | B2 | 1/2021 | Schairer et al. |
| 11,075,853 | B2 | 7/2021 | Miller et al. |
| 2005/0141479 | A1 | 6/2005 | Ozugur et al. |
| 2016/0164696 | A1 | 6/2016 | Yuan et al. |
| 2019/0098091 | A1 | 3/2019 | Shinde et al. |
| 2020/0074522 | A1 | 3/2020 | Balasubramanian et al. |
| 2020/0076637 | A1 | 3/2020 | Vishwari et al. |
| 2020/0099545 | A1* | 3/2020 | Hong ...................... H04L 67/55 |
| 2022/0309901 | A1* | 9/2022 | Silverstein ........... G08B 21/182 |

OTHER PUBLICATIONS

International Search Report dated Jul. 3, 2023, issued in International Patent Application No. PCT/KR2023/004378.

* cited by examiner

METHOD AND APPARATUS FOR PROVIDING APPROPRIATE ALTERNATE RECEIVER TO PERFORM INPUT EVENTS IN IOT ENVIRONMENT

CROSS-REFERENCE TO RELATED APPLICATION(S)

This application is a continuation application, claiming priority under § 365(c), of an International application No. PCT/KR2023/004378, filed on Mar. 31, 2023, which is based on and claims the benefit of an Indian patent application number 202211050315, filed on Sep. 2, 2022, in the Indian Intellectual Property Office, the disclosure of which is incorporated by reference herein in its entirety.

BACKGROUND

1. Field

The disclosure relates to performing input events in an internet of things (IOT) environment. More particularly, the disclosure relates to a method and system for providing an appropriate alternate receiver to perform one or more input events in the IOT environment.

2. Description of Related Art

Technology plays an essential role in providing a comfortable life. At present, a wide variety of tasks are being performed using the technology like internet which is a global system of interconnected computers and computer networks that uses a standard protocol to communicate with each other, and Internet of Things (IOT) is one of aspects of the Internet. The IOT is a network of devices that includes not just computers and computer networks but daily life appliances and gadgets that are able to share and receive data with other devices via an IOT communications network.

Although the IOT has made life easier, most users are still unable to perform other important input events while busy at work. In any instance, whenever an important input event is notified to a receiver at a time when the receiver is busy or occupied with some work, the receiver may either switch from ongoing work to perform the notified input event, which affects work efficiency, or provide an unsatisfactory response while attending the notified input event. In both cases, either the work or the notified input event gets affected, as both of these are required to be performed by the receiver. In addition, there may be another instance in which the receiver is inaccessible to the notified input event due to a network problem or the receiver's personal choice to not get involved in the notified input event, and thus left unhandled for timely action.

At present, there exist numerous prior arts that disclose about forwarding the input event in an IOT environment considering proximity of the device to the receiver.

The existing prior art discloses an optimized predictive routing and methods. The method comprises retrieving and/or predicting a profile of a current customer and future customers, determining which agents are currently available and which agents are expected to be available, and providing a routing recommendation based on the profile retrieval or prediction for the current customer and the future customers, and the currently available agents' and expected available agents' proficiency at handling customers with the retrieved and/or predicted profiles.

Further, the existing prior art discloses an intelligent communication routing system and method. The prior art further discloses a communications routing system, and method, for representing a plurality of predicted characteristics of a plurality of communications sources, each having an economic utility, representing a plurality of predicted characteristics of a plurality of communications targets each having an economic utility, and determining an optimal routing between the plurality of communications sources and the plurality of communications targets, by maximizing an aggregate utility with respect to the respective predicted characteristics of communications source and communications destination represented by linkages.

In addition, the existing prior art discloses a system and method for providing enhanced answering services in a time-sensitive manner. The prior art discloses a computing system of an answering service which answers an incoming call from a calling party on behalf of a called party, and allows an agent to converse with the calling party relating to a purpose of the incoming call from the calling party. At a triggering point, a signal is received from the agent while the incoming call from the calling party is still in progress. The triggering point occurs when the agent determines that the calling party is calling regarding a predetermined urgent matter. Contact with the called party is commenced upon receiving the signal and communication between the calling party and the called party is effectuated while the incoming call from the calling party is still in progress.

However, these prior arts are silent about identifying the satisfaction rate of response provided by receiver for the input event. Further, these prior arts do not disclose about identifying appropriate alternate receiver for performing the input event when the receiver is not able to provide a satisfactory response. Also, no encryption mechanism and access rights are disclosed in these prior arts, which impact privacy of the receiver.

Therefore, in light of the foregoing discussion, there exists a need to overcome the aforementioned drawbacks associated with the existing method and system for providing an appropriate alternate receiver to perform one or more input events in the IOT environment.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for providing an appropriate alternate receiver to perform one or more input events in the IOT environment.

Additional aspects will be set forth in part in the description which follows and, in part, will be apparent from the description, or may be learned by practice of the presented embodiments.

In accordance with an aspect of the disclosure, a method for providing an appropriate alternate receiver to perform one or more input events in an Internet of Things (IOT) environment is provided. The method includes performing, by the electronic device, one or more actions, including determining essentiality of the one or more input events, classifying the one or more input events into any one of two categories, including private and non-private based on the one or more input event assessed parameters and metadata of the one or more input events received from a service expected database, and determining expected response for the one or more input events, In determining, by the electronic device, current availability of a receiver for the one or more input events, and predicting, by the electronic device, response of the receiver to the one or more input events, based on current availability of the receiver with respect to the expected response.

The method further includes determining, by the electronic device, current availability of the receiver for the one or more input events. In an embodiment, the current availability of the receiver for the one or more input events is determined using digital occupancy, physical occupancy, and device readiness. The digital occupancy is determined using in-call status and device activity, the physical occupancy is determined using calendar event status and non-device activity, and the device readiness is determined using one of device profiles which include silent, loud, and vibrate, one of status of battery which includes bad or good, and one of classified network parameters, the network parameter is determined using first set of parameters which include Reference Signal Received Power (RSRP), Reference Signal Received Quality (RSRQ), percentage of block error rate (BLER %), and bandwidth and classified into a predefined value for poor network, average network, and good network.

The method further includes predicting response of the receiver to the one or more input events based on current availability of the receiver with respect to the expected response. In an embodiment, the response of the receiver is predicted as satisfactory or unsatisfactory. The response of the receiver to the one or more input events is satisfactory when current availability of the receiver is yes for the expected response and unsatisfactory when current availability of the receiver is no for the expected response.

The method further includes determining, by an IOT hub, the appropriate alternate receiver from among one or more alternate receivers to perform the one or more input events when expected predicted response to the one or more input events is unsatisfactory. In an embodiment, the appropriate alternate receiver is determined based on prediction score, which is calculated using a predefined percentage of affinity score, a predefined percentage of interaction score, and a predefined percentage of persona score. Thereafter, the method includes providing, by the IOT hub, encrypted text and one or more essential information analyzed from the one or more input event assessed parameters to the appropriate alternate receiver to perform one or more input events in the IOT environment based on access rights of the appropriate alternate receiver.

In accordance with an aspect of the disclosure, a system for providing an appropriate alternate receiver to perform one or more input events in an Internet of Things (IOT) environment is provided. The system provides an appropriate alternate receiver when receiver is unable to provide a satisfactory response. The system includes an essentiality module to perform one or more actions which comprises determining essentiality of the one or more input events, classifying the one or more input events, and determining expected response for the one or more input events. The system further includes a receiver availability module for determine current availability of the receiver for the one or more input events, a receiver response prediction module for predicting response of the receiver to the one or more input events based on current availability of the receiver with respect to the expected response, an alternate receiver identification module for identify the appropriate alternate receiver from among one or more alternate receivers to perform the one or more input events when predicted response to the one or more input events is unsatisfactory, and an alternate receiver preparation module for providing encrypted text and one or more essential information analyzed from the one or more input event assessed parameters to the appropriate alternate receiver to perform one or more input events right in the IOT environment based on the access rights of the appropriate alternate receiver.

In an embodiment, the essentiality module includes an input event assessment sub-module to extract one or more inputs from a call notification manager and a service expected database for the one or more input events and provide the one or more input event assessed parameters. The essentiality module further includes an essentiality determining sub-module to determine essentiality of the one or more input events based on the one or more input event assessed parameters received from the input event assessment sub-module, an input event classifying sub-module to classify the one or more input events in any one of two categories including private and non-private based on the one or more input event assessed parameters and metadata of the one or more input events received from a service expected database, and an expected response determining sub-module to determine the expected response for the one or more input events in terms of information exchange and availability of the receiver such as digital and physical.

In an embodiment, the receiver availability module includes a network strength determining sub-module to receive a first set of parameters from an access technology manager of device and determine and classify network parameters of the device using the first set of parameters. The receiver availability module further includes a receiver activity determining sub-module to receive inputs from an activity manager of the device and determine digital occupancy and physical occupancy of the receiver, a device readiness determining sub-module to receive inputs from the network strength determining sub-module and a device manager of the device and determine device readiness for the receiver, and a receiver availability sub-module to determine current availability of the receiver for the one or more input events.

In an embodiment, the alternate receiver identification module includes an affinity determining sub-module to receive type of service for each of the one or more alternate receivers from a service expected database and determine affinity score based on frequency of availing type of service for each of the one or more alternate receivers. The alternate receiver identification module further includes an interaction determining sub-module to receive frequency of interactions of each of the one or more alternate receivers with respect to the receiver from an interaction manager of device and determine interaction score, a persona determining sub-module to receive second set of parameters for each of the one or more alternate receivers from a user profile manager of the device and determine persona score of each of the one or more alternate receivers with respect to persona of the receiver, and an appropriate alternate receiver identification sub-module to receive input from the affinity determining sub-module, the interaction determining sub-module, and the persona determining sub-module and identify the appropriate alternate receiver from among one or more alternate receivers.

In an embodiment, the alternate receiver preparation module includes an encryption sub-module to encrypt input text based on classification of the one or more input events. The alternate receiver preparation module further includes an essential information assessment sub-module to analyze the one or more input event assessed parameters based on expected response to provide the one or more essential information required to perform the one or more events and an access right determining sub-module to determine access rights of the appropriate alternate receiver. The alternate receiver preparation module further includes an alternate receiver preparation sub-module to provide encrypted text, the one or more essential information to the appropriate alternate receiver using capability of most suitable IOT device depending on the determined access rights.

In accordance with another aspect of the disclosure, an IOT hub for providing an appropriate alternate receiver to perform one or more input events in an Internet of Things (IOT) environment is provided. The IOT hub includes memory storing one or more computer programs and one or more processors communicatively coupled to the memory, wherein the one or more computer programs include computer-executable instructions that, when executed by the one or more processors individually or collectively, cause the IOT hub to in case that response of a receiver is predicted as unsatisfactory, the at least one processor determine the appropriate alternate receiver from among one or more alternate receivers. The at least one processor provides the encrypted text and one or more essential information analyzed from the one or more input event assessed parameters to the appropriate alternate receiver, based on access rights of the appropriate alternate receiver.

In accordance with an aspect of the disclosure, an electronic device for providing an appropriate alternate receiver to perform one or more input events in an Internet of Things (IOT) environment is provided. The electronic device includes memory storing one or more computer programs and one or more processors communicatively coupled to the memory, wherein the one or more computer programs include computer-executable instructions that, when executed by the one or more processors individually or collectively, cause the electronic device to perform one or more actions including determining essentiality of the one or more input events, classifying the one or more input events, and determining expected response for the one or more input events, determine current availability of a receiver for the one or more input events, predict response of the receiver to the one or more input events, based on current availability of the receiver with respect to the expected response.

In accordance with an aspect of the disclosure, one or more non-transitory computer-readable storage media storing one or more computer programs including computer-executable instructions that, when executed by one or more processors of an electronic device individually or collectively, cause the electronic device to perform operations are provided. The operations including performing, by the electronic device, one or more actions including determining essentiality of the one or more input events, classifying the one or more input events, and determining expected response for the one or more input events, determining, by the electronic device, current availability of a receiver for the one or more input events, and predicting, by the electronic device, response of the receiver to the one or more input events, based on current availability of the receiver with respect to the expected response.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
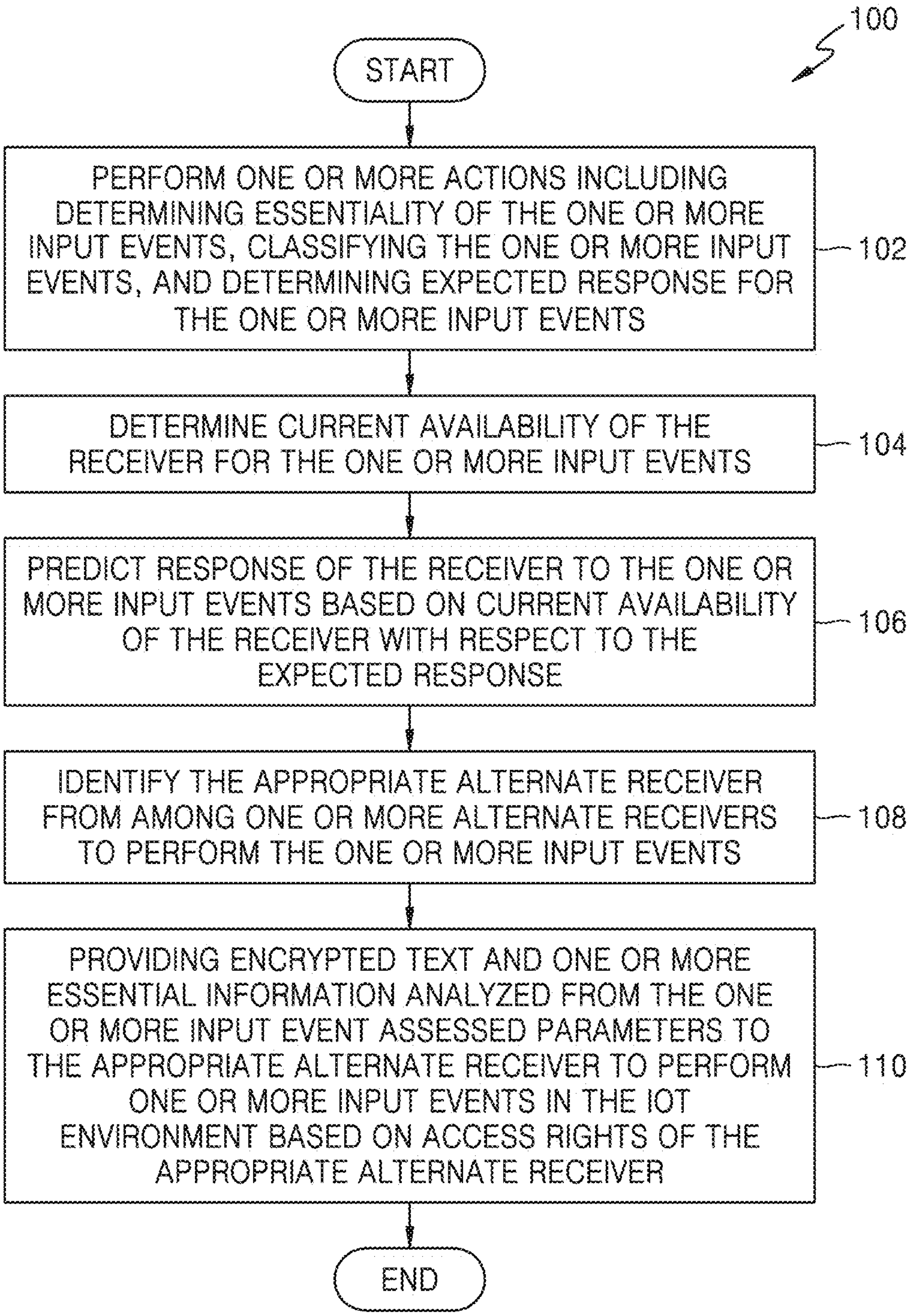
FIG. 1 illustrates a flow diagram showing a method for providing an appropriate alternate receiver to perform one or more input events in an Internet of Things (IOT) environment when receiver is unable to provide a satisfactory response, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Furthermore, in the description, references to “one embodiment” or “an embodiment” means that a particular feature, structure, or characteristic described in connection with the embodiment is included in at least one embodiment of the disclosure. The appearance of the phrase “in one embodiment” in various places in the specification is not necessarily referring to the same embodiment, nor are separate or alternative embodiments mutually exclusive of other embodiments. Further, the terms “a” and “an” used herein do not denote a limitation of quantity, but rather denote the presence of at least one of the referenced items. Moreover, various features are described which may be exhibited by some embodiments and not by others. Similarly, various requirements are described, which may be requirements for some embodiments but not for other embodiments.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates a flow diagram showing a method for providing an appropriate alternate receiver to perform one or more input events in an IOT environment when receiver is unable to provide a satisfactory response, according to an embodiment of the disclosure.

Figure 2:
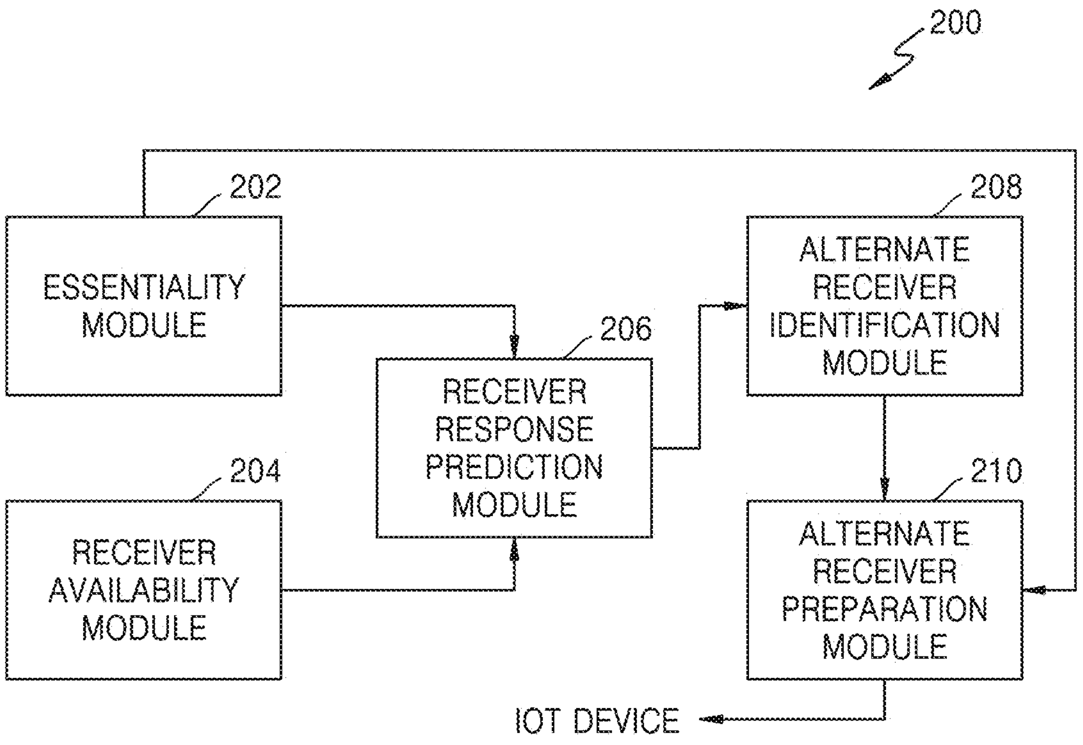
FIG. 2 illustrates a block diagram of a system for providing an appropriate alternate receiver to perform one or more input events in an IOT environment when receiver is unable to provide a satisfactory response, according to an embodiment of the disclosure.

FIG. 2 illustrates a block diagram of a system for providing the appropriate alternate receiver to perform one or more input events in the IOT environment when receiver is unable to provide the satisfactory response, according to an embodiment of the disclosure.

Referring to FIG. 1, a flow diagram showing a method (100) for providing an appropriate alternate receiver to perform one or more input events in an IOT environment when receiver is unable to provide a satisfactory response is disclosed. The method may be explained in conjunction with the system disclosed in FIG. 2. In the flow diagram, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 1 may be executed substantially concurrently or the blocks may sometimes be executed in the reverse order, depending upon the functionality involved. Any process descriptions or blocks in flowcharts should be understood as representing modules, segments, or portions of code that include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flow diagram starts at operation 102 and proceeds to operation 110.

At first, one or more actions are performed, at operation 102. One or more input events (doorbell, call, notification, etc.) are received in the IOT environment. The one or more actions include determining essentiality of the one or more input events. The essentiality of the one or more input events depends upon one or more input event assessed parameters, which include historical and current information of the one or more input events. Input events are assessed for the application name, any trigger prior to the input events and any information that can be derived at the moment of the input events. In one embodiment, the historical information includes call acceptance history and service expected and the current information includes context, caller ID, app, and location nearby related to the one or more input events.

The one or more actions further include classifying the one or more input events into one of two categories, including private and non-private. In one embodiment, the one or more input events are classified based on the one or more input event assessed parameters and metadata of the one or more input events received from a service expected database. The service expected database maintains services expected by users in the IOT environment, basis notification, browser activity. If the detail related to input event assessed parameters finds a match in the service expected database, then metadata for that particular input event is returned.

The one or more actions further include determining expected response for the one or more input events. The expected response is determined in terms of information exchange and availability of the receiver such as digital and physical. In one embodiment, whether any information exchange is required with the input events is sensed to deliver the expected response. The information exchange type expected response depends on the one or more input event assessed parameters and/or metadata received from the service expected database. In one embodiment, the type of availability required to be fulfilled by the receiver to deliver the expected response is predicted basis the type of the input events. The availability of the receiver type expected response depends on type of one or more input events which include one of notification, call, and doorbell.

Successively, current availability of the receiver for the one or more input events is determined, at operation 104. In one embodiment, the current availability of the receiver for the one or more input events is determined using digital occupancy, physical occupancy, and device readiness by utilizing a machine learning method. The digital occupancy is determined using in-call status and device activity. In one embodiment, the device is a computing device or a handheld or portable electronic device capable of providing data communication between two or more individuals such as a mobile phone, a text messaging device, a laptop, a paging device, a personal digital assistant, and a computer. In an embodiment, the digital occupancy is determined when the receiver is utilizing the mobile phone for call or some other activities like playing games, texting messages, or capturing photos.

The physical occupancy is determined using calendar event status and non-device activity. In one embodiment, the calendar event may be obtained from the device, and includes, at least but not limited to, deadlines, milestones, parties, meetings, anniversaries, appointments, birthdays, etc., and the non-device activity may be obtained from a wearable device, and includes, at least but not limited to, physical activity, resting, etc. In an embodiment, the wearable device includes, at least but not limited to, wearable electronic device worn and/or implanted in user's body, or tattooed on skin, wristband, and wristwatch.

The device readiness is determined using one of device profiles which include silent, loud, and vibrate, one of status of battery which includes bad or good, and one of classified network parameters, the network parameter is determined using first set of parameters which include Reference Signal Received Power (RSRP), Reference Signal Received Quality (RSRQ), percentage of block error rate (BLER %), and bandwidth and classified into a predefined value for poor network, average network, and good network.

In case that the expected availability of the receiver is digital, physical occupancy doesn't matter. If the receiver is digitally occupied, then irrespective of device readiness, the availability is "NO". If the receiver is digitally not occupied, then depending on device readiness, availability is determined. In case that the expected availability of the receiver is physical, device readiness doesn't matter. If the receiver is physically occupied, then irrespective of digital occupancy, the availability is "NO". If the receiver is physically not occupied, then depending on digital occupancy, availability is determined.

Successively, response of the receiver to the one or more input events is predicted, at operation 106. The response of the receiver is based on current availability of the receiver with respect to the expected response and the response of the receiver is predicted as satisfactory or unsatisfactory. In one embodiment, response of the receiver to the one or more input events is satisfactory when current availability of the receiver is yes for the expected response and unsatisfactory when current availability of the receiver is no for the expected response.

Successively, identifying the appropriate alternate receiver from among one or more alternate receivers, at operation 108. In one embodiment, the appropriate alternate receiver is identified to perform the one or more input events when predicted response to the one or more input events is unsatisfactory. The appropriate alternate receiver is identified based on prediction score. In one embodiment, the prediction score is calculated using a predefined percentage of affinity score, a predefined percentage of interaction score, and a predefined percentage of persona score. The affinity score may means degree of affinity between a particular alternate receiver and a particular service. The affinity score depends on frequency of availing type of services and is calculated for each of one or more alternate receivers. The interaction score may means degree of interaction between the alternate receivers and the receiver. The interaction score depends on frequency of interactions of the receiver with each of the one or more alternate receivers. The persona score means degree of that how close is the alternate receivers' persona o that of the receiver. The persona score depends on second set of parameters. The second set of parameters is associated with personal information of the one or more alternate receivers or the receiver. The second set of parameters include one or more age group, type such as personal and professional, language, and health profile such as good, average, and bad, and is calculated for each of the one or more alternate receivers with respect to persona of the receiver. In one embodiment, the prediction score may calculate basis A*45%+B*45%+C*10%. A is the affinity score, B is the interaction score, and B is the persona score. In one embodiment, the list of the alternate receivers is provided along with the prediction score and the highest may be the appropriate alternate receiver.

Thereafter, encrypted text and one or more essential information are provided to the appropriate alternate receiver, at operation 110, to perform the one or more input events in the IOT environment based on access rights of the appropriate alternate receiver. The encrypted text and the one or more essential information are provided to the appropriate alternate receiver using capability of most suitable IOT device. The IOT device is any hardware device that connects wirelessly to a network and has the ability to transmit data, examples include sensors, gadgets, appliances, and other machines that collect and exchange data over the Internet. In one embodiment, encrypted text is provided to the appropriate alternate receiver based on classification of the one or more input events. If the classification of the input events is private, the private keywords are encrypted, keeping the one or more essential information intact. The one or more essential information is analyzed from the one or more input event assessed parameters based on the expected response for performing the one or more input events. If information exchange is true, the one or more essential information that may be required to handle the input events is provided. The access rights means whether the rights of the appropriate alternate receiver should be granted and the access rights of the appropriate alternate receiver are determined based on the prediction score.

According for the above method, the disclosure can provide expected response with high satisfaction rate considering security and privacy of the receiver for the essential input events.

Referring to FIG. 2, a block diagram of a system (200) for providing the appropriate alternate receiver to perform one or more input events in the IOT environment when receiver is unable to provide a satisfactory response is illustrated, in accordance with one or more embodiments of the disclosure. The system (200) comprises an essentiality module (202) configured for performing one or more actions. The one or more actions include determining essentiality of the one or more input events, classifying the one or more input events, and determining expected response for the one or more input events. In one embodiment, the essentiality module (202) is configured to be used in the device. The essentiality module (202) is described in more details with reference to FIG. 3.

The system (200) further comprises a receiver availability module (204) configured to determine current availability of the receiver for the one or more input events. The current availability of the receiver for the one or more input events is determined using digital occupancy, physical occupancy, and device readiness. In one embodiment, the receiver availability module (204) is configured to be used in the device. The receiver availability module (204) is described in more details with reference to FIG. 4.

The system (200) further comprises a receiver response prediction module (206) configured to predict response of the receiver to the one or more input events based on the current availability of the receiver with respect to the expected response. In one embodiment, the response of the receiver is predicted as satisfactory or unsatisfactory.

The system (200) further comprises an alternate receiver identification module (208) configured for identifying the appropriate alternate receiver from among one or more alternate receivers to perform the one or more input events when predicted response to the one or more input events is unsatisfactory. In one embodiment, the alternate receiver identification module (208) is configured to be used in the IOT hub. The alternate receiver identification module (208) is described in more details with reference to FIG. 5.

The system (200) further comprises an alternate receiver preparation module (210) configured to provide encrypted text and one or more essential information analyzed from the one or more input event assessed parameters to an appropriate alternate receiver to perform one or more input events in the IOT environment based on the access rights of the appropriate alternate receiver. It should be noted that the alternate receiver with highest prediction score is considered as the appropriate alternate receiver among the one or more alternate receivers. In one embodiment, the alternate receiver preparation module (210) is configured to be used in the IOT hub. The alternate receiver preparation module (210) is described in more details with reference to FIG. 6.

Figure 3:
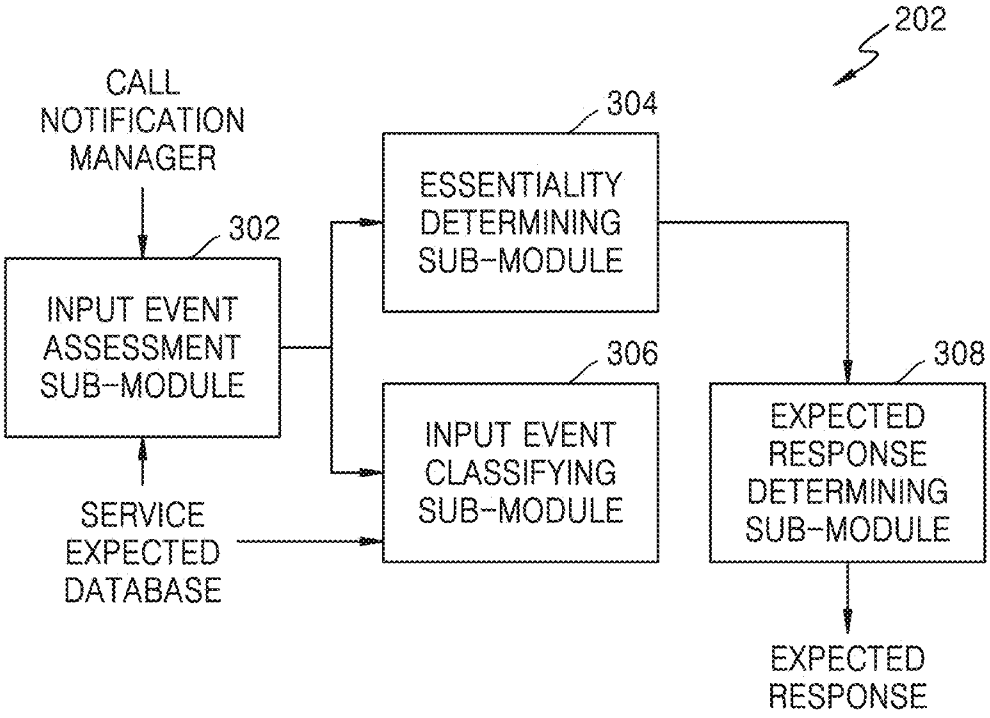
FIG. 3 illustrates a block diagram of an essentiality module, according to an embodiment of the disclosure.

FIG. 3 illustrates a block diagram of an essentiality module, according to an embodiment of the disclosure.

Referring to FIG. 3, the essentiality module (202) comprises an input event assessment sub-module (302). In one embodiment, the input event assessment sub-module (302) is configured to receive the one or more input events. In an embodiment, the one or more input events are received from an IOT hub. The IOT hub is referred to a service hosted in a cloud that acts as a central message hub for communication between an IOT application and devices connected to the IOT application. Further, type of the one or more input events includes at least one of, but not limited to, a notification, a call, and a doorbell. The disclosure is intended to include any type of the one or more input events that can be performed in the IOT environment. The input event assessment sub-module (302) is further configured to extract the one or more inputs from a call notification manager and a service expected database for the received one or more input. In one embodiment, the call notification manager includes the call and notification related information and the service expected database includes data such as notification/SMS/message/alert/text, browser history, service expected, time and metadata for all receivers in the IOT environment. It should be noted that the service expected database is present in a system database which collects all the data from the IOT devices. The service expected database maintains and updates the data for all the receivers in real time by utilizing an application executing in background. Table 1 discloses a sample of the service expected database for the receiver.

TABLE 1

A sample of service expected database

| Notification/ SMS Alert | Browser History? | Service expected | Time | Metadata |
|---|---|---|---|---|
| Yes | No | Amazon | 27th June | OTP |
| No | Yes | CarDekho | X | |
| Yes | No | Zomato | 28th June 3:30pm | |
| Yes | No | MyGate | 27th April 2:45pm | |
| Yes | No | SOS Alert | 27th April 7:45pm | |
| Yes | No | Health alert | 28th April 1:20pm | |
| Yes | No | Utility alert | 28th April 11:20am | |
| No | Yes | Samsung | 30th April 01:00 pm | AC repair details |
| Yes | No | Ola | 4th May 4:31 PM | Destination, OTP |
| Yes | No | Amazon | 22nd May 06:20pm | Upcoming anniversary on 23rd May |
| Yes | No | MedIndia | 21st May 5PM | Doctor details, hospital details, appointment details |

As shown, notification/sms alert discloses if any message or alert is being received for the service expected from Amazon on 27 June and metadata discloses one-time password (OTP) is required to be shared by the receiver. Further, browser history discloses if the receiver has visited any webpage.

The input event assessment sub-module (302) is further configured to provide the one or more input event assessed parameters. The one or more input event assessed parameters include historical and current information of the one or more input events. The historical information includes any information prior to triggering of the one or more input events which is relevant to the one or more input events and current information includes any information that can be derived at the moment of the one or more input events. Table 2 discloses sample of one or more input event assessed parameters which includes context, identification of caller (caller ID), application, call acceptance history, location nearby, and service expected for the one or more input events.

TABLE 2

A sample of one or more input event assessed parameters

| Type of One or More Input Events | One or More Input Event Assessed Parameters: Context | Caller ID | App | Call Acceptance History | Location Nearby? | Service Expected |
|---|---|---|---|---|---|---|
| Doorbell | Pre-approved entry for Amazon on an apartment security application | N.A. | Amazon | N.A. | Yes | Yes |
| Call | N.A. | Amazon | N.A. | Yes | No | Yes |
| Notification | Myntra Sale | N.A. | Myntra | N.A. | N.A. | Yes |
| Call | Purpose for the call is unknown | Ola | Ola | Yes | No | Yes |
| Notification | Message from driver on Ola | N.A. | Ola | N.A. | Yes | Yes |
| Approval | Notification for approval for Dominos on MyGate | N.A. | Dominos | N.A. | Yes | Yes |
| Doorbell | Pre-approved entry for Samsung on an apartment security application | N.A. | Samsung | N.A. | Yes | Yes |
| Notification | S-Health Reminder for walking | N.A. | S-Health | N.A. | N.A. | No |
| Notification | Notification from MedIndia for Appointment Re-Schedule and confirmation | N.A. | MedIndia | N.A. | No | Yes |
| Call | N.A. | Private | N.A. | Yes | No | No |
| Call | SOS | Private | N.A. | Yes | No | No |
| Call | Purpose for the call is unknown | Samsung | N.A. | Yes | Yes | Yes |

As shown in Table 2, the one or more input event assessed parameters: context includes “Pre-approved entry for Amazon on an apartment security application, caller ID includes “N.A.”, app includes “amazon”, call acceptance history includes “N.A.”, location nearby includes “Yes”, and service expected includes “Yes” provided for the one or more input events “doorbell’. Similarly, the one or more input event assessed parameters are provided for the one or more input events “call”, “notification”, and “approval”.

The essentiality module (202) further comprises an essentiality determining sub-module (304). In one embodiment, the essentiality determining sub-module (304) is configured to determine the essentiality of the one or more input events based on the one or more input event assessed parameters received from the input event assessment sub-module (302) by utilizing a machine learning method.

The essentiality module (202) further comprises an input event classifying sub-module (306). In one embodiment, the input event classifying sub-module (306) is configured to classify the one or more input events in any one of two categories including private and non-private. The classification may be based on the one or more input event assessed parameters and metadata of the one or more input events received from the service expected database. In one embodiment, the metadata of the one or more input events is received from the service expected database only when the one or more input event assessed parameters from the input event assessment sub-module (302) matches to one of the data of the service expected database. It should be noted that the metadata herein referred to a data which is required to perform the one or more input events. In an embodiment, the metadata includes a keyword, the OTP, address, appointment details, hospital details, or any other detail which is required to perform the one or more input events.

The essentiality module (202) further comprises an expected response determining sub-module (308). In one embodiment, the expected response determining sub-module (308) is configured to determine the expected response for the one or more input events. The expected response is determined in terms of information exchange and availability of the receiver such as digital and physical. The information exchange type expected response is determined from the one or more input event assessed parameters and/or metadata received from the service expected database. It should be noted that the information exchange type expected response provides if any information exchange is required to perform the one or more input events. The availability of the receiver type expected response is determined considering type of one or more input events. It should be noted that the availability of the receiver type expected response determines type of availability required to perform the one or more input events. Table 3 discloses the expected responses determined for the one or more input events.

TABLE 3

A sample of expected responses determined for the one or more input events

| | One or More Input Event Assessed Parameters | | | | | | | Metadata | | Expected Response | |
|---|---|---|---|---|---|---|---|---|---|---|---|
| Type of One or More Input Events | Context | Caller ID | App | Call Acceptance History | Location Nearby? | Service Expected | Essentiality | for the One or More Input Events | Classification of the One or More Input Events | Information Exchange | Availability |
| Doorbell | Pre-approved entry for Amazon on an apartment security application | N.A. | Amazon | N.A. | Yes | Yes | Yes | OTP | Non-Private | TRUE | Physical |
| Call | N.A. | Amazon | N.A. | Yes | No | Yes | Yes | | Non-Private | FALSE | Digital |
| Notification | Myntra Sale | N.A. | Myntra | N.A. | N.A. | Yes | No | | N.A. | N.A. | N.A. |
| Call | Purpose for the call is unknown | Ola | Ola | Yes | No | Yes | Yes | Destination, OTP | Non-Private | TRUE | Digital |
| Notification | Message from driver on Ola | N.A. | Ola | N.A. | Yes | Yes | Yes | | Non-Private | TRUE | Digital |
| Approval | Notification for approval for Dominos on MyGate | N.A. | Dominos | N.A. | Yes | Yes | Yes | | Non-Private | TRUE | Digital |
| Doorbell | Pre-approved entry for Samsung on an apartment security application | N.A. | Samsung | N.A. | Yes | Yas | Yes | AC repair details | Non-Private | TRUE | Physical |
| Notification | S-Health Reminder for walking | N.A. | S-Health | N.A. | N.A. | No | No | | N.A. | N.A. | N.A. |
| Notification | Notification from MedIndia for Appointment Re-Schedule and confirmation | N.A. | MedIndia | N.A. | No | Yes | Yes | Doctor details, Hospital details, Appointment details | Private | FALSE | Digital |
| Call | N.A. | Private | N.A. | Yes | No | No | No | | N.A. | N.A | N.A. |
| Call | SOS | Private | N.A. | Yes | No | No | Yes | | Non-Private | FALSE | Digital |
| Call | Purpose for the call is unknown | Samsung | N.A. | Yes | Yes | Yes | Yas | AC repair details | Non-Private | TRUE | Digital |

As shown in Table 3, essentiality of the one or more input events is determined and provided as "Yes" or "No". In one case, when the essentiality is "Yes", then classification and expected response of the one or more input events are determined. In another case, when the essentiality is "No", no further action is performed by the essentiality module (202).

The system (200) further comprises a receiver availability module (204) configured to determine current availability of the receiver for the one or more input events. The current availability of the receiver for the one or more input events is determined using digital occupancy, physical occupancy, and device readiness. In one embodiment, the receiver availability module (204) is configured to be used in the device. The receiver availability module (204) is described in more details with reference to FIG. 4.

Figure 4:
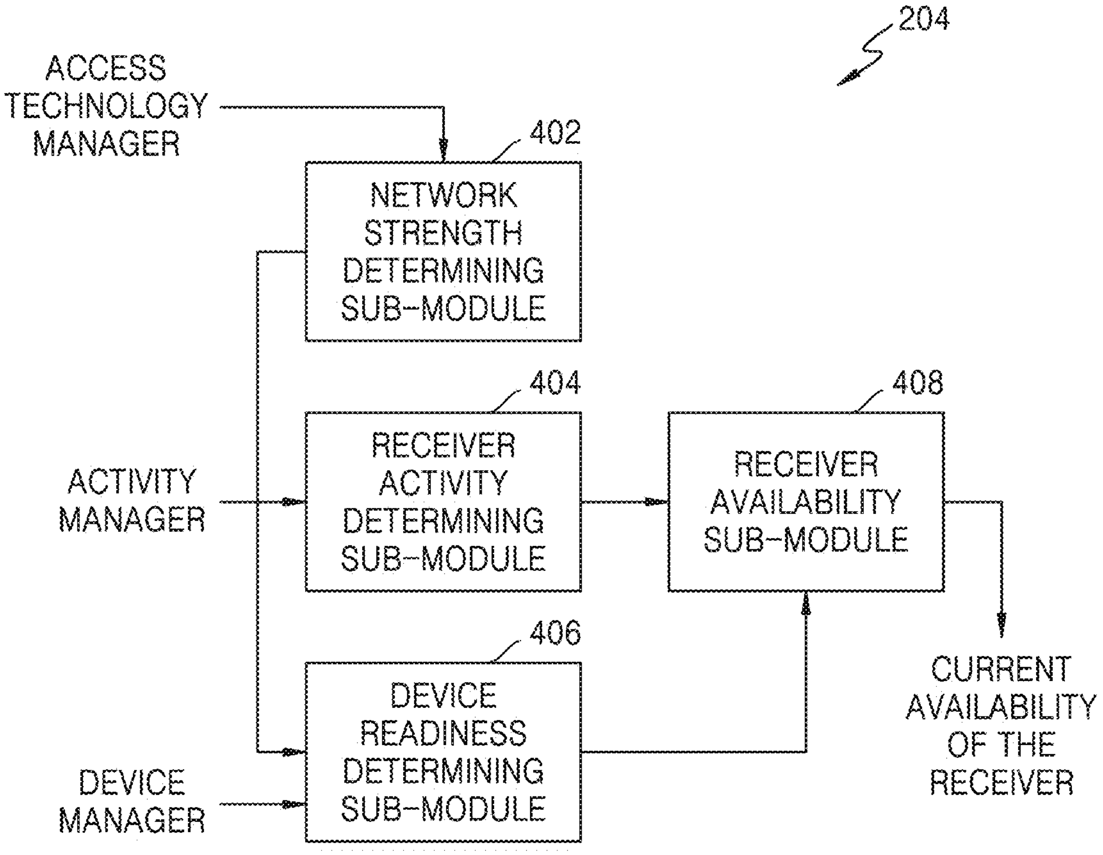
FIG. 4 illustrates a block diagram of a receiver availability module, according to an embodiment of the disclosure.

FIG. 4 illustrates a block diagram of a receiver availability module, according to an embodiment of the disclosure.

Referring to FIG. 4, the receiver availability module (204) comprises a network strength determining sub-module (402). In one embodiment, the network strength determining sub-module (402) is configured to receive a first set of parameters from an access technology manager of the device. The first set of parameters includes Reference Signal Received Power (RSRP), Reference Signal Received Quality (RSRQ), percentage of block error rate (BLER %), and bandwidth. The RSRP is an average received power of a single reference signal resource element and is calculated per each eNB (DL) signal available at a given location. The RSRQ indicates quality of the received reference signal and the RSRQ measurement provides additional information when the RSRP is not sufficient to make a reliable handover or cell reselection decision. The BLER is used in wireless communication technology to determine the in-sync or out-of-sync indication during radio link monitoring. The in-sync condition is determined when normal BLER is 2% and the out-of-sync condition is determined when normal BLER is 10%.

The network strength determining sub-module (402) is further configured to determine and classify network parameters of the device using the first set of parameters. The network parameters are classified into a predefined value for a poor network, average network, and a good network. Table 4 discloses different network parameters of the device with respect to the first set of parameters.

TABLE 4

A sample of different network parameters of the device with respect to the first set of parameters

| RSRP<br>(in dBm)<br>RSRP<br><−100 (1) −80<br>to −100<br>(2) >= −80 (3) | RSRQ<br>(in dBm)<br>RSRQ<br><−20 (1) −10<br>to −20<br>(2) >= −10 (3) | BLER<br>(in %)<br>BLER<br>>70 (1)<br>20 to 70 (2)<br><20 (3) | Bandwidth <= 10<br>(1) 10-20<br>(2) >= 20<br>(3) | Network<br>Parameter<br>(NP)<br>1-4 Poor (1)<br>4-6<br>Average (2)<br>7-10 Good<br>(3) | NP<br>Final<br>Output |
|---|---|---|---|---|---|
| 1 | 1 | 1 | 1 | 3.33 | 1 |
| 2 | 2 | 3 | 3 | 8.33 | 3 |
| 3 | 3 | 3 | 3 | 10 | 3 |

As shown, the network parameter of value 3.33 is having network parameter output 1 (1 is a predefined value for showing a poor network in the range of 1 to 4) when the RSRP is 1 (1 is showing the RSRP<−100), the RSRQ is 1 (1 is showing the RSRQ<−20), the BLER is 1 (1 is showing the BLER>70) and the bandwidth is 1 (1 is showing the bandwidth<=10). Herein, the network parameter value 3.33 is equal to the sum of the values of RSRP 1, RSRQ 1, BLER 1, and Bandwidth 1 divided by the sum of the maximum values of RSRP, RSRQ, BLER, and Bandwidth, multiplied by 10.

Similarly, the network parameter of value 8.33 is having the network parameter output 3 (3 is a predefined value for showing a good network in the range of 7 to 10) when the RSRP is 2 (2 is showing the RSRP −80 to <−100), the RSRQ is 2 (2 is showing the RSRQ −10 to −20), the BLER is 3 (3 is showing the BLER<20) and the bandwidth is 3 (3 is showing the bandwidth>=20). Similarly, the network parameter of value 10 is having the network parameter output 3 (3 is the predefined value for showing the good network in the range of 7 to 10) when the RSRP is 3 (3 is showing the RSRP>=−80), the RSRQ is 3 (3 is showing the RSRQ>=−10), the BLER is 3 (3 is showing the BLER<20) and the bandwidth is 3 (3 is showing the bandwidth>=20).

The receiver availability module (204) further comprises a receiver activity determining sub-module (404). In one embodiment, the receiver activity determining sub-module (404) is configured to receive inputs from an activity manager of the device, which includes in-call status, device activity, calendar event status, and non-device activity. The receiver activity determining sub-module (404) is further configured to determine digital occupancy and physical occupancy of the receiver. In one embodiment, the digital occupancy is determined using the in-call status and the device activity, while the physical occupancy is determined using the calendar event status and the non-device activity. Table 5 discloses the inputs and corresponding digital occupancy and physical occupancy.

TABLE 5

A sample of inputs and corresponding digital occupancy and physical occupancy

| In-Call Status | Device Activity | Calendar Event Status | Non-device Activity | Digital Occupancy | Physical Occupancy |
|---|---|---|---|---|---|
| No | Game | No | No | Yes | No |
| No | YouTube | No | Workout | Yes | Yes |
| Yes | Idle | No | No | Yes | No |
| Yes | Surfing/Browsing | No | No | Yes | No |
| No | No | Yes | No | No | Yes |
| No | Idle | No | No | No | No |
| No | Idle | No | Sleeping | No | Yes |
| No | Idle | No | Smart Bidet Active | No | Yes |

As shown, the digital occupancy of the receiver is present only when the receiver is performing the in-device activity and/or busy on call and the physical occupancy is present only when there exists a calendar event for the receiver and/or when the receiver is performing non-device activity.

The receiver availability module (204) further comprises a device readiness determining sub-module (406). In one embodiment, the device readiness determining sub-module (406) is configured to receive inputs from the network strength determining sub-module (402) and a device manager of the device. The inputs from the device manager include device profiles, which include silent, loud, and vibrate and the status of battery which includes bad or good. The device readiness determining sub-module (406) is further configured to determine device readiness for the receiver using inputs from the network strength determining sub-module (402) and the device manager. Table 6 discloses device readiness with respect to different inputs.

TABLE 6

A sample of device readiness with respect to different inputs

| Network Parameters | Device Profiles | Status of Battery | Device Readiness |
|---|---|---|---|
| 1 | Silent | Bad | Low |
| 3 | Loud | Good | High |
| 2 | Vibrating | Good | Medium |

As shown, the device readiness is low in case the network parameter output is 1, the device profile is silent, and the status of battery is bad. The device readiness is high in case the network parameter output is 3, the device profile is loud, and the status of battery is good. The device readiness is medium in case the network parameter output is 2, the device profile is vibrating, and the status of battery is good.

The receiver availability module (204) further comprises a receiver availability sub-module (408) to determine current availability of the receiver for the one or more input events. Table 7a discloses current availability of the receiver when the expected availability is digital.

TABLE 7a

| Current availability of the receiver when expected availability is digital | | | |
|---|---|---|---|
| Digital Occupancy | Physical Occupancy | Device Readiness | Current Availability |
| Yes | X | X | No |
| No | X | High | Yes |
| No | X | Low | No |

As shown, it should be noted that when the expected availability is digital, the physical occupancy of the receiver doesn't matter. Further, if the receiver is occupied digitally, then irrespective of the device readiness, the current availability of the receiver remains No and if the receiver is not occupied digitally, then depending on the device readiness, the current availability of the receiver is determined. The current availability of the receiver is present when the receiver is not occupied digitally and the device readiness is also high.

Table 7b discloses the current availability of the receiver when the expected availability is physical.

TABLE 7b

| Current availability of the receiver when expected availability is physical | | | |
|---|---|---|---|
| Digital Occupancy | Physical Occupancy | Device Readiness | Current Availability |
| X | Yes | X | No |
| Yes | No | X | No |
| No | No | X | Yes |

As shown, it should be noted that when the expected availability is physical, the device readiness of the receiver doesn't matter. Further, if the receiver is occupied physically, then irrespective of the digital occupancy, the current availability of the receiver remains No and if the receiver is not occupied physically, then depending on the digital occupancy, the current availability of the receiver is determined. The current availability of the receiver is present when the physical occupancy of the receiver is not there, and the current availability of the receiver doesn't exist when the receiver is physically occupied.

The system (200) further comprises a receiver response prediction module (206) configured to predict response of the receiver to the one or more input events based on the current availability of the receiver with respect to the expected response. In one embodiment, the response of the receiver is predicted as satisfactory or unsatisfactory. In an embodiment, response of the receiver to the one or more input events is satisfactory when current availability of the receiver is Yes for the expected response and unsatisfactory when current availability of the receiver is No for the expected response. Table 8 discloses the Receiver response prediction.

TABLE 8

| Receiver response prediction | | |
|---|---|---|
| Expected Response | Current Availability of the Receiver | Receiver Response Prediction |
| Physical | Yes | Satisfactory |
| Physical | No | Unsatisfactory |
| Digital | Yes | Satisfactory |
| Digital | No | Unsatisfactory |

As shown, the receiver response prediction is satisfactory when the current availability of the receiver received from the receiver availability module (204) is "Yes" for the expected response received from the essential module (202) and unsatisfactory when the current availability of the receiver is "No" for the received expected response. It should be noted that the receiver response prediction module (206) is to be used in the device.

The system (200) further comprises an alternate receiver identification module (208) configured for identifying the appropriate alternate receiver from among one or more alternate receivers to perform the one or more input events when predicted response to the one or more input events is unsatisfactory. In one embodiment, the alternate receiver identification module (208) is configured to be used in the IOT hub. The alternate receiver identification module (208) is described in more details with reference to FIG. 5.

Figure 5:
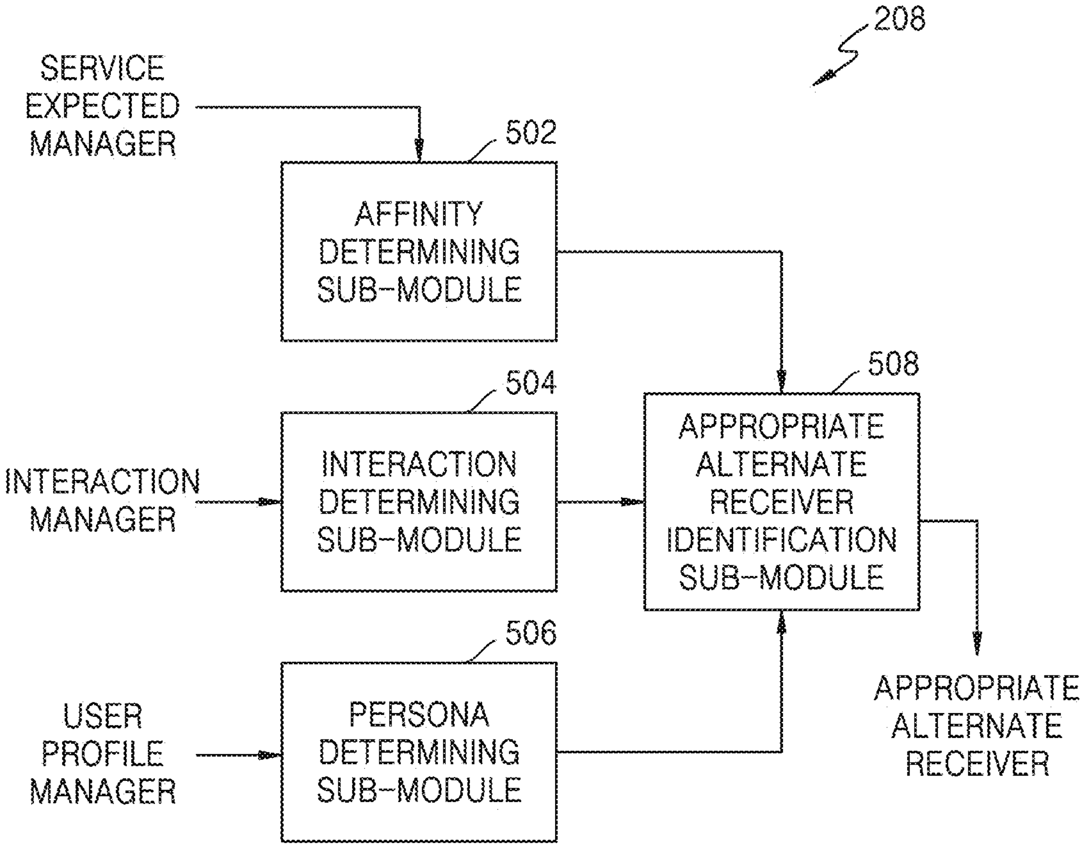
FIG. 5 illustrates block diagram of an alternate receiver identification module, according to an embodiment of the disclosure.

FIG. 5 illustrates block diagram of an alternate receiver identification module, according to an embodiment of the disclosure.

Referring to FIG. 5, the alternate receiver identification module (208) comprises an affinity determining sub-module (502). In one embodiment, the affinity determining sub-module (502) is configured to receive the type of service for each of the one or more alternate receivers from the service expected database. The affinity determining sub-module (502) is further configured to determine the affinity score based on the frequency of availing type of service for each of the one or more alternate receivers. The affinity score is determined based on the frequency of availing the service and is maintained using the service expected database. Table 9 discloses the affinity score for each of the one or more alternate receivers for the type of service.

TABLE 9

| The affinity score for each of the one or more alternate receivers for the type of service. | | |
|---|---|---|
| One or more Alternate Receiver | Type of Service | Affinity Score |
| Number1 | Amazon | 7 |
| Number2 | Amazon | 1 |
| Number 3 | Amazon | 4 |
| Number1 | Samsung | 0 |
| Number2 | Samsung | 0 |
| Number 3 | Myntra | 3 |
| Number 4 | Myntra | 6 |
| Number 3 | mygate | 5 |
| Number 5 | Ola | 2 |

As shown, the affinity score for alternate receivers Number 1 and Number 2 is 0, for type of service "Samsung", since these alternate receivers have not availed the service of Samsung. However, the affinity score for alternate receiver Number 1 for Amazon service is 7, since the alternate receiver has availed the service of Amazon.

The alternate receiver identification module (208) further comprises an interaction determining sub-module (504) configured to receive frequency of interactions of each of the one or more alternate receivers with respect to the receiver from an interaction manager of the device. The interaction determining sub-module (504) further configured to determine interaction score. In one embodiment, the interaction score depends on frequency of interactions between the receiver with the one or more alternate receivers. In an embodiment, Table 10 discloses a receiver and the one or more alternate receivers' interaction quotient.

TABLE 10

Receiver and the one or more Alternate Receiver Interaction Quotient

| Receiver | One or More Alternate Receiver | Interaction Score |
|---|---|---|
| Self | Number1 | 10 |
| Self | Number2 | 2 |
| Self | Number3 | 8 |
| Self | Number4 | 4 |
| Self | Number 5 | 5 |

As shown, the alternate receiver Number 1 has more interaction with the receiver and the alternate receiver Number 2 has least interaction with the receiver compared to other one or more alternate receivers.

The alternate receiver identification module (208) further comprises a persona determining sub-module (506) configured to receive second set of parameters for each of the one or more alternate receivers from a user profile manager of the device. In one embodiment, the second set of parameters include one or more age group, type such as personal and professional, language such as Hindi, English, and others, and health profile such as good, average, and bad. The persona determining sub-module (506) further configured to determine final persona score of each of the one or more alternate receivers by dividing a predefined value with the difference value of the persona score of each of the one or more alternate receivers with the persona score of the receiver. In case, difference value of the persona score is zero for the one or more alternate receivers, then the final persona score may be computed by adding 1 to maximum final persona score of the one or more alternate receivers. Table 11 discloses the persona score of each of the one or more alternate receivers with respect to persona of the receiver.

TABLE 11

Persona score of each of the one or more alternate receivers

| One or More Alternate Receiver | One or More Age Group (KId: 1, Gen: X, Gen Y: 3, GenZ: 4, Old: 5) | Type (Personal: 1 or Professional: 2) | Language (Hindl: 1, English: 2, Others: 3) | Health Profile (Good: 1, Average: 2, Bad: 3) | Persona Score (Sum of score of age group, Type, Language, Health profile) | Difference with Receiver Persona score | Final Persona Score (13/Difference with the Receiver persona) | |
|---|---|---|---|---|---|---|---|---|
| Receiver Persona | 2 | 2 | 1 | 1 | 6 | | | |
| Number 1 | 1 | 1 | 1 | 1 | 4 | 2 | 6.5 | |
| Number 2 | 4 | 2 | 2 | 1 | 9 | 3 | 4.333333333 | |
| Number 3 | 5 | 1 | 1 | 3 | 10 | 4 | 3.25 | |
| Number 4 | 2 | 1 | 1 | 1 | 5 | 1 | 13 | |
| Number 5 | 1 | 1 | 3 | 1 | 6 | 0 | 14 | If difference is 0, then Maximum Final Persona Score +1 |

As shown, the persona score for the alternate receiver Number 1 is 6.5, for the alternate receiver Number 2 is 4.3333, for the alternate receiver Number 3 is 3.25, for the alternate receiver Number 4 is 13 and for the alternate receiver Number 5 is 14.

The alternate receiver identification module (208) further comprises an appropriate alternate receiver identification sub-module (508) configured to receive input from the affinity determining sub-module (502), the interaction determining sub-module (504), and the persona determining sub-module (506). The appropriate alternate receiver identification sub-module (508) is further configured to identify the appropriate alternate receiver from among one or more alternate receivers. In one embodiment, the appropriate alternate receiver is identified based on prediction score, the prediction score is calculated using a predefined percentage of affinity score, a predefined percentage of interaction score, and a predefined percentage of persona score. In one embodiment, the list of the alternate receivers is provided along with the prediction score and the highest may be the appropriate alternate receiver. Table 12 discloses the prediction score for the one or more alternate receivers.

TABLE 12

Prediction score for each of the one or more alternate receivers with respect to the receiver

| Receiver | Type of service | One or More Alternate Receivers | Prediction Score |
|---|---|---|---|
| Self | Amazon | Number 1 | 8.3 |
| Self | Amazon | Number 3 | 1.783333333 |
| Self | Amazon | Number 2 | 5.725 |
| Self | Ola | Number 5 | 4.55 |

As shown, the prediction score for the alternate receiver Number 1 is 8.3, the alternate receiver Number 3 is 1.783333333, the alternate receiver Number 2 is 5.725, and the alternate receiver Number 5 is 4.55. In an embodiment, the prediction score is calculated using summation of 45% of the affinity score, 45% of the interaction score, and 10% of the persona Score. The alternate receiver Number 1, who has the highest prediction score, may be the appropriate alternate receiver.

The system (200) further comprises an alternate receiver preparation module (210) configured to provide encrypted text and one or more essential information analyzed from the one or more input event assessed parameters to an appropriate alternate receiver to perform one or more input events in the IOT environment based on the access rights of the appropriate alternate receiver. It should be noted that the alternate receiver with highest prediction score is considered as the appropriate alternate receiver among the one or more alternate receivers. In one embodiment, the alternate receiver preparation module (210) is configured to be used in the IOT hub. The alternate receiver preparation module (210) is described in more details with reference to FIG. 6.

Figure 6:
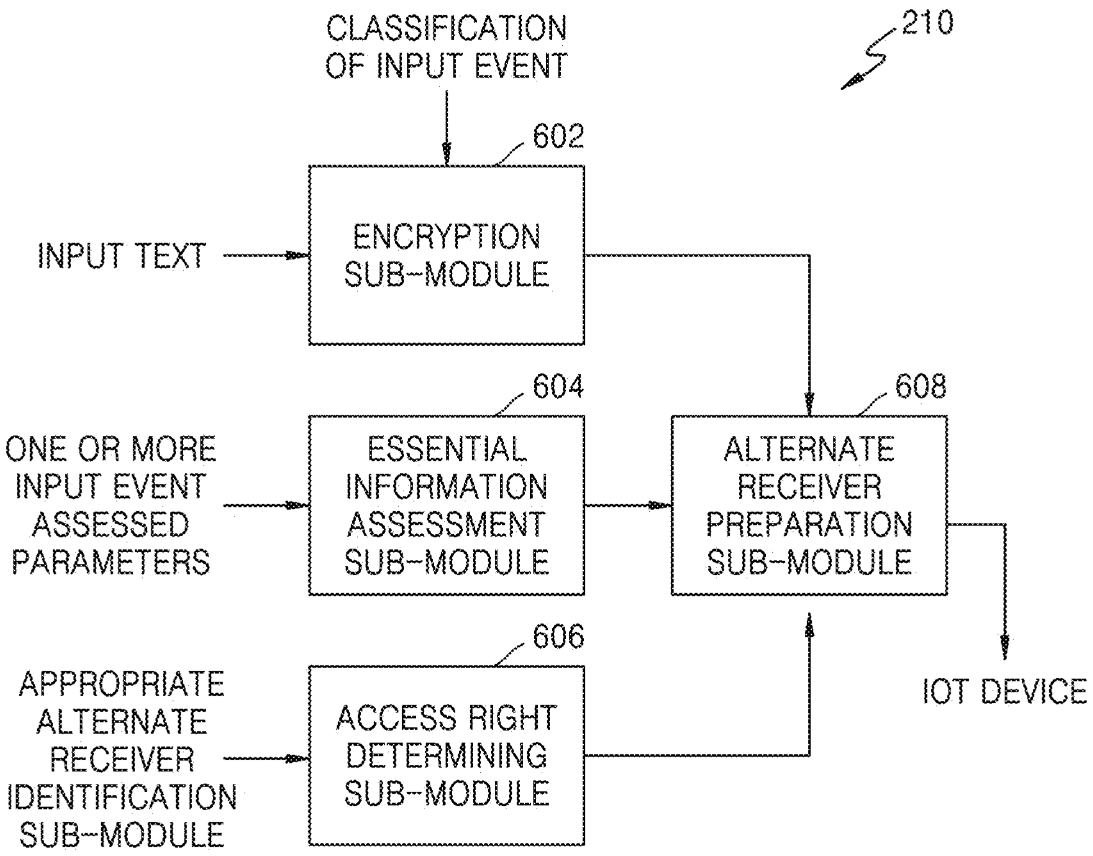
FIG. 6 illustrates block diagram of an alternate receiver preparation module, according to an embodiment of the disclosure.

FIG. 6 illustrates block diagram of an alternate receiver preparation module, according to an embodiment of the disclosure.

Referring to FIG. 6, the alternate receiver preparation module (210) comprises an encryption sub-module (602). In one embodiment, the encryption sub-module (602) is configured to encrypt input text based on the classification of the one or more input events performed by the essential module (202). In an embodiment, the encryption sub-module (602) encrypt the text/message/sms/notification only when the one or more input events is classified as private as shown in Table 13.

TABLE 13

| Encryption of input text | | |
|---|---|---|
| Classification of the one or more input events | Input Text | Encrypted Text |
| Private | Your doctor consultation for menstruation problem is re-scheduled from 5PM to 3PM. Please confirm | Your doctor consultation for ***** is re-scheduled from 5PM to 3PM. Please confirm |

As shown, the input text which includes appointment detail of the receiver is encrypted to maintain privacy of the receiver.

The alternate receiver preparation module (210) further comprises an essential information assessment sub-module (604) to analyze the one or more input event assessed parameters based on the expected response to provide the one or more essential information required to perform the one or more events. In an embodiment, the one or more essential information includes context, app, and metadata. The alternate receiver preparation module (210) further comprises an access right determining sub-module (606) to determine access rights of the appropriate alternate receiver. In one embodiment, the access rights of the appropriate alternate receiver are determined based on the prediction score computed by the alternate receiver identification module (208).

It should be noted that all rights are granted to the one or more alternate receiver if prediction score of the one or more alternate receiver is greater than a predefined value and in case the prediction score of the one or more alternate receiver is less than the predefined value then only some rights are granted to the one or more alternate receiver. In an embodiment, the predefined value is 6 as shown in Table 14.

TABLE 14

| Access rights | |
|---|---|
| Prediction Score | If Prediction Score is greater than 6, all rights granted? |
| 3.8 | No |
| 6.2 | Yes |

The alternate receiver preparation module (210) further comprises an appropriate alternate receiver preparation sub-module (608) configured to receive the encrypted texted from the encryption sub-module (602), the essential information from the essential information assessment sub-module (604), and the access right from the access right determining sub-module (606) and provide to the appropriate alternate receiver. After successful determining the access rights of the appropriate alternate receiver, the encrypted text and one or more essential information are provided to the appropriate alternate receiver using capability of the most suitable IOT device. Table 15 discloses one or more alternate receivers (Number 1, Number 2, and Number 3) required to perform the one or more input events and respective access rights, encrypted text, and capability of the IOT device.

TABLE 15

| One or more alternate receivers and respective access rights, encrypted text, and capability of IOT device. | | | | | | | | | |
|---|---|---|---|---|---|---|---|---|---|
| One or More Alternate Receiver | Information Exchange | Context | App | Metadata for input event | Essential Information Assessment | Encrypted Text | Access Rights | Capability | Device |
| Number 3 | TRUE | Pre-approved entry for Amazon on an apartment security application | Amazon | OTP | OTP | NA | Yes | Display | TV |
| Number 1 | TRUE | Purpose for the call is unknown | Ola | OTP | Route to reach destination, OTP, estimated fare, estimated reach time | NA | Yes | Display | Display device |
| Number 1 | TRUE | MedIndia, Appointment Re-Schedule and | MedIndia | Doctor details, hospital details, appointment details | Doctor details hospital details, appointment details | Your doctor consultation for ***** is rescheduled from | No | Display | Display device |

TABLE 15-continued

| One or more alternate receivers and respective access rights, encrypted text, and capability of IOT device. | | | | | | | | | |
|---|---|---|---|---|---|---|---|---|---|
| One or More Alternate Receiver | Information Exchange | Context | App | Metadata for input event | Essential Information Assessment | Encrypted Text | Access Rights | Capability | Device |
| | | confirmation, Private Keywords | | | | 5PM to 3PM. Please confirm | | | |
| Number 3 | FALSE | SOS | Private | N.A. | NA | NA | Yes | Call | Smartphone |
| Number 1 | TRUE | Pre-approved entry for Samsung on an apartment security application | Samsung | AC repair details | AC repair details | NA | Yes | Display | Wearables |

It should be noted that for the working of this disclosure, the device of the receiver is required to be connected to the IOT hub. Once device is registered and connected to the IOT hub, the service expected database starts maintaining data for notification/sms alert, browser history, service expected, time and meta data.

Figure 7:
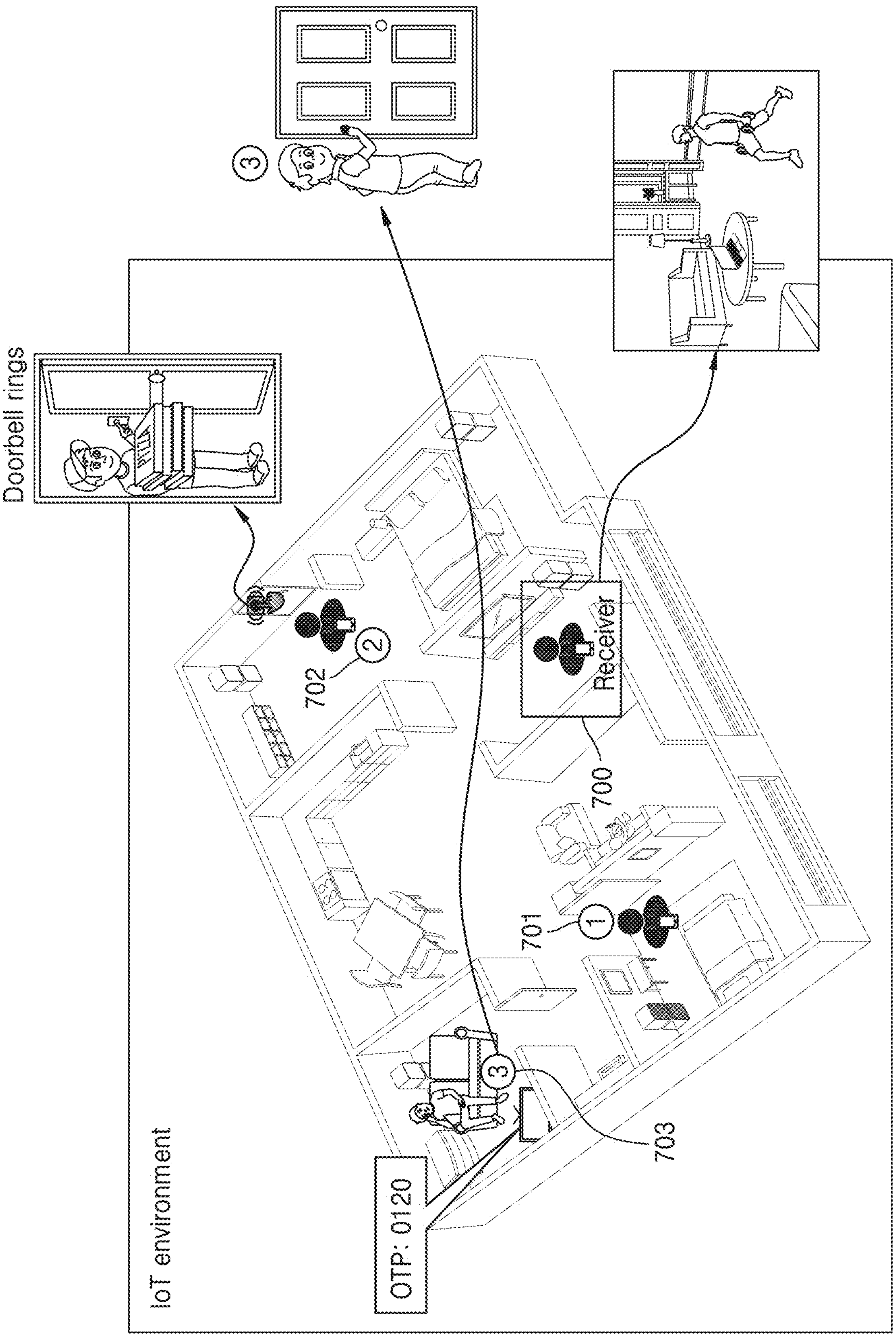
FIG. 7 illustrates a specific scenario according to an embodiment of the disclosure.

FIG. 7 illustrates a specific scenario according to an embodiment of the disclosure.

Referring to FIG. 7, the first scenario in Table 15 is for the input event "doorbell for Amazon delivery" which discloses, the alternate receiver "Number 3" (703) is the appropriate alternate receiver, essential information OTP is required as the information exchange is true and the OTP is provided in the display of the TV to enable the alternate receiver "Number 3" (703) to perform the input event. This scenario is explained below in detail by utilizing modules of the system (200).

On receiving the event, the system first analyzes the context of the input event and finds that the Amazon delivery is expected today. The essentiality module (202) of the system (200) then determines the essentiality of the input event "doorbell for Amazon delivery", classifies the input event as non-private, and determines that the expected response requires information exchange and physical availability of the receiver (700). After successful determination of the expected response, the receiver availability module (204) of the system (200) determines the current availability of the receiver (700) and the receiver response prediction module (206) of the system (200), based on determining the receiver (700) is performing the physical activity, can provide an unsatisfactory response. After successful determination of the receiver response, the alternate receiver identification module (208) of the system (200) determines the availability of alternate receivers "Number 1" (701), "Number 2" (702), and "Number 3" (703) by computing the prediction score for each of these alternate receivers. Then, after determining the alternate receiver "Number 3" (703) has the highest prediction score, the alternate receiver preparation module (210) of the system (200) then displays the OTP on the display of the TV upon determining the alternate receiver "Number 3" (703) is watching TV at the time. Thus, the system (200) makes the alternate receiver "Number 3" (703) to collect the Amazon delivery by providing the OTP and provide the satisfactory response.

The second scenario in Table 15 may operate similarly to first scenario. The second scenario is for the input event "call from Ola", which discloses, the alternate receiver "Number 1" is the appropriate alternate receiver to receive the call requiring information such as route to reach the destination, OTP, estimated fare, estimated reach time and the OTP is provided in the display of a display device to enable the alternate receiver "Number 1" to perform in the IOT environment. This scenario is explained below in detail by utilizing modules of the system (200).

On receiving the call from Ola, the system (200) analyzes the context of the input event and finds that the service is expected from Ola. The essentiality module (202) of the system (200) then determines the essentiality of the input event "call from Ola", classifies the input event as non-private, and determines expected response requires information exchange and digital availability. After successful determination of the expected response, the receiver availability module (204) of the system (200) determines the current availability of the receiver and the receiver response prediction module (206) of the system (200), based on determining the receiver is busy on another call and performing internet surfing/browsing on the device, can provide an unsatisfactory response. After successful determination of the receiver response, the alternate receiver identification module (208) of the system (200) determines the availability of alternate receivers "Number 1", "Number 2", and "Number 3" by computing the prediction score for each of these alternate receivers. Then after determining the alternate receiver Number 1 has the highest prediction score, the alternate receiver preparation module (210) of the system (200) then switch the call to the alternate receiver "Number 1" and display the route to reach the destination, OTP, estimated fare, estimated reach time on the wrist watch of the alternate receiver "Number 1".

The third scenario in Table 15 may operate similarly to first scenario and second scenario. The third scenario is for the input event "notification for appointment re-schedule and confirmation", which discloses the alternate receiver "Number 1" is the appropriate alternate receiver to receive the notification for appointment re-schedule in the IOT environment. This scenario is explained in detail by utilizing modules of the system (200).

On receiving the event, the system (200) analyzes the context of the input event and finds that the service is expected from MedIndia. The essentiality module (202) of the system (200) then determines the essentiality of the input event "Notification from MedIndia for Appointment", classifies the input event as private, and determines expected response requires information exchange and digital availability. After successful determination of the expected response, the receiver availability module (204) of the system (200) determines the current availability of the receiver and the receiver response prediction module (206) of the system (200), based on determining the device readiness of receiver is low, can provide an unsatisfactory response. After successful determination of the receiver response, the alternate receiver identification module (208) of the system (200) determines the availability of alternate receivers "Number 1", "Number 2", and "Number 3" by computing the prediction score for each of these alternate receivers. Then after determining the alternate receiver "Number 1" has the highest prediction score among all the alternative receivers, the alternate receiver preparation module (210) of the system (200) then encrypt the notification and display the encrypted notification to the alternate receiver "Number 1" on the display of the display device. Thus makes the alternate receiver "Number 1" to receive the notification. However, the alternate receiver Number 1 is not able to make the confirmation due to no access right for the same.

Figure 8:
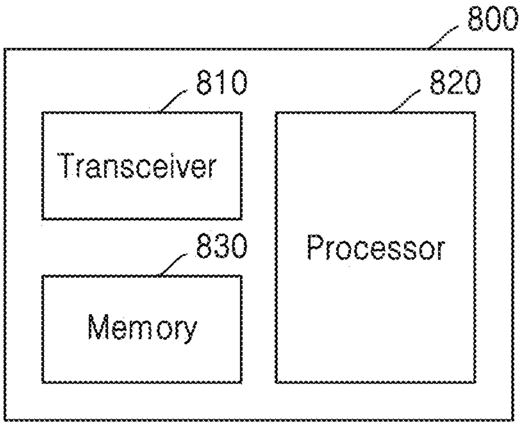
FIG. 8 illustrates a block diagram of an IOT hub according to an embodiment of the disclosure.

FIG. 8 illustrates a block diagram of an IOT hub (800) according to an embodiment of the disclosure.

Referring to FIG. 8, an IOT hub (800) according to an embodiment of the disclosure include a transceiver (810), a processor (820) and memory (830). However, all of the illustrated components are not essential. The IOT hub (800) may be implemented by more or less components than those illustrated in FIG. 8. In addition, the processor (820) and the transceiver (810) and the memory (830) may be implemented as a single chip according to another embodiment.

The IOT hub (800) may be an part of the system (200) in the disclosure or may be the system (200) in the disclosure itself. The IOT hub (800) may include the proposed alternate receiver identification module (208) and the proposed alternate receiver preparation module (210). The aforementioned alternate receiver identification module (208) and alternate receiver preparation module (210) may operate according to the method described in the disclosure.

The aforementioned components will now be described in detail. The processor (820) may include one or more processors or other processing devices that control the proposed function, process and/or method. Operation of the IOT hub (800) aforementioned in this disclosure may be implemented by the processor (820). The processors (820) configured to execute instructions communicatively coupled to the memory, wherein the instructions one or more computer programs include computer-executable instructions that, when executed by the one or more processors individually or collectively, cause the IOT hub (800) to operations described in this disclosure.

The processor (820) may receive, from an electronic device (900), information associated with: essentiality of the one or more input events, classification of the one or more input events, expected response for the one or more input events, current availability of the receiver for the one or more input events, and response of the receiver to the one or more input events. In case that the response of the receiver is predicted as unsatisfactory, the processor (820) may determine the appropriate alternate receiver from among one or more alternate receivers. The processor (820) may provide the encrypted text and one or more essential information analyzed from the one or more input event assessed parameters to the appropriate alternate receiver, based on access rights of the appropriate alternate receiver.

The processor (820) may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor (820) may include one or a plurality of processors. In this case, the one or more processors may be a general-purpose processor such as a CPU, an AP, or a digital signal processor (DSP), a graphics-only processor such as a GPU or a vision processing unit (VPU), or an artificial intelligence-only processor such as an NPU. For example, when one or more processors are processors dedicated to artificial intelligence, the processors dedicated to artificial intelligence may be designed as a hardware structure specialized for processing a specific artificial intelligence model.

The transceiver (810) may include a RF transmitter for up-converting and amplifying a transmitted signal, and a RF receiver for down-converting a frequency of a received signal. However, according to an embodiment, the transceiver (810) may be implemented by more or less components than those illustrated in components. The transceiver (810) may be connected to the processor (820) and transmit and/or receive a signal. The signal may include control information and data. In addition, the transceiver (810) may receive the signal through a wireless channel and output the signal to the processor (820). The transceiver (810) may transmit a signal output from the processor (820) through the wireless channel.

The memory (830) may store the control information or the data included in a signal obtained by the IOT hub (800). The memory (830) may be connected to the processor (820) and store at least one instruction or a protocol or a parameter for the proposed function, process, and/or method. The memory (830) may include read-only memory (ROM) and/or random access memory (RAM) and/or hard disk and/or compact disc (CD)-ROM and/or digital versatile disc (DVD) and/or other storage devices.

Figure 9:
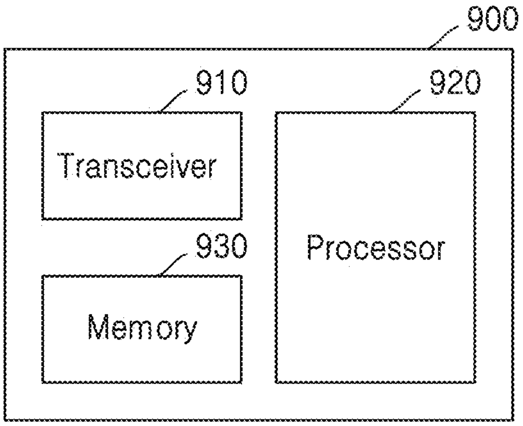
FIG. 9 illustrates a block diagram of an electronic device according to an embodiment of the disclosure.

FIG. 9 illustrates a block diagram of an electronic device (900) according to an embodiment of the disclosure.

Referring to FIG. 9, an electronic device (900) according to an embodiment of the disclosure include a transceiver (910), a processor (920) and memory (930). However, all of the illustrated components are not essential. The IOT hub may be implemented by more or less components than those illustrated in FIG. 9. In addition, the processor (920) and the transceiver (910) and the memory (930) may be implemented as a single chip according to another embodiment.

The electronic device (900) may be an part of the system (200) in the disclosure or may be the system (200) in the disclosure itself. The electronic device (900) may include the proposed essentiality module (202), the proposed receiver availability module (204), and the proposed receiver response prediction module (206). The aforementioned essentiality module (202), receiver availability module (204), and receiver response prediction module (206) may operate according to the method described in the disclosure.

The aforementioned components will now be described in detail. The processor (920) may include one or more processors or other processing devices that control the proposed function, process and/or method. Operation of the electronic device (900) aforementioned in this disclosure may be implemented by the processor (920). The processors (920) configured to execute instructions communicatively coupled to the memory, wherein the instructions one or more computer programs include computer-executable instructions that, when executed by the one or more processors individually or collectively, cause the electronic device (900) to operations described in this disclosure.

The processor (920) may perform one or more actions including determining essentiality of the one or more input events, classifying the one or more input events, and determining expected response for the one or more input events. The processor (920) may determine current availability of the receiver for the one or more input events. The processor (920) may predict response of the receiver to the one or more input events, based on current availability of the receiver with respect to the expected response.

The processor 920 may determine the essentiality of the one or more input events based on one or more input event assessed parameters.

The processor 920 may classify the one or more input events based on the one or more input event assessed parameters and metadata of the one or more input events received from a service expected database.

The processor 920 may determine the expected response based on at least one of: the one or more input event assessed parameters, the metadata received from the service expected database, or type of the one or more input events.

The processor 920 may determine the current availability of the receiver for the one or more input events based on at least one of: digital occupancy, physical occupancy, or device readiness.

In case that the response of the receiver is predicted as unsatisfactory, the appropriate alternate receiver is identified from among one or more alternate receivers. Also, the encrypted text and one or more essential information analyzed from the one or more input event assessed parameters are provided to the appropriate alternate receiver, based on access rights of the appropriate alternate receiver. The appropriate alternate receiver is identified determined based on prediction score, and the prediction score is calculated based on a predefined percentage of affinity score, a predefined percentage of interaction score, and a predefined percentage of persona score. The encrypted text provided to the appropriate alternate receiver is determined based on the classification of the one or more input events, and the one or more essential information is analyzed from the one or more input event assessed parameters based on the expected response for performing the one or more input events, and the access rights of the appropriate alternate receiver are determined based on the prediction score. The encrypted text and the one or more essential information are provided to the appropriate alternate receiver based on capability of most suitable Internet of Things (IOT) device.

The processor (920) may include one or a plurality of processors. In this case, the one or more processors may be a general-purpose processor such as a CPU, an AP, or a digital signal processor (DSP), a graphics-only processor such as a GPU or a vision processing unit (VPU), or an artificial intelligence-only processor such as an NPU. For example, when one or more processors are processors dedicated to artificial intelligence, the processors dedicated to artificial intelligence may be designed as a hardware structure specialized for processing a specific artificial intelligence model.

The processor (920) may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The transceiver (910) may include a RF transmitter for up-converting and amplifying a transmitted signal, and a RF receiver for down-converting a frequency of a received signal. However, according to an embodiment, the transceiver (910) may be implemented by more or less components than those illustrated in components. The transceiver (910) may be connected to the processor (920) and transmit and/or receive a signal. The signal may include control information and data. In addition, the transceiver (910) may receive the signal through a wireless channel and output the signal to the processor (920). The transceiver (910) may transmit a signal output from the processor (820) through the wireless channel.

The memory (930) may store the control information or the data included in a signal obtained by the electronic device (900). The memory (930) may be connected to the processor (920) and store at least one instruction or a protocol or a parameter for the proposed function, process, and/or method. The memory (930) may include read-only memory (ROM) and/or random access memory (RAM) and/or hard disk and/or CD-ROM and/or DVD and/or other storage devices.

Figure 10:
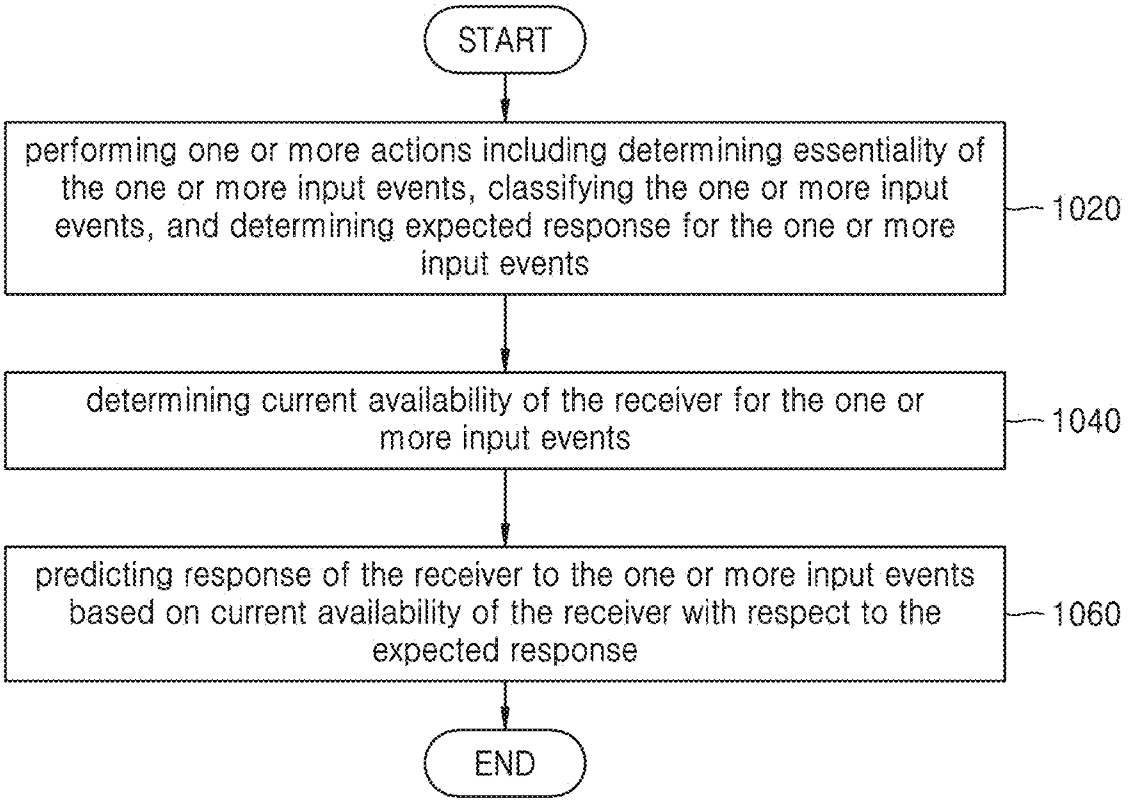
FIG. 10 illustrates a flow diagram showing a method for providing an appropriate alternate receiver to perform one or more input events in an IOT environment when receiver is unable to provide a satisfactory response, according to an embodiment of the disclosure.

FIG. 10 illustrates a flow diagram showing a method for providing an appropriate alternate receiver to perform one or more input events in an IOT environment when receiver is unable to provide a satisfactory response, according to an embodiment of the disclosure.

Referring to FIG. 10, a flow diagram showing a method for providing an appropriate alternate receiver to perform one or more input events in an IOT environment when receiver is unable to provide a satisfactory response is disclosed. The electronic device (900) performs operation 1020 through operation 1060 similarly with operation 102 through operation 106 describing in the FIG. 1 of the disclosure.

Figure 11:
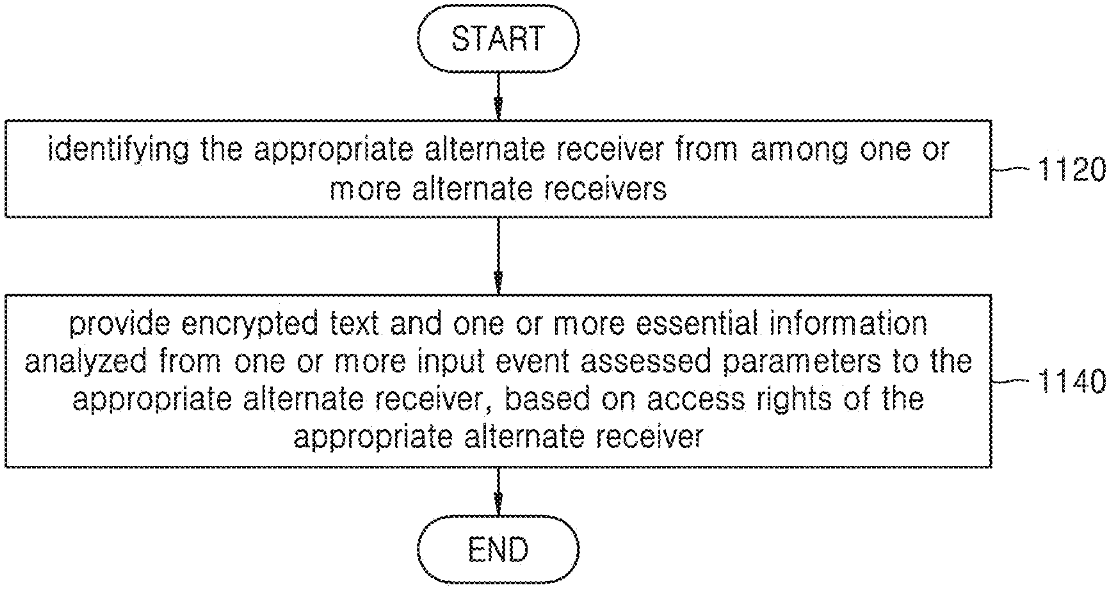
FIG. 11 illustrates a flow diagram showing a method for providing an appropriate alternate receiver to perform one or more input events in an IOT environment when receiver is unable to provide a satisfactory response, according to an embodiment of the disclosure.

FIG. 11 illustrates a flow diagram showing a method for providing an appropriate alternate receiver to perform one or more input events in an IOT environment when receiver is unable to provide a satisfactory response, according to an embodiment of the disclosure.

Referring to FIG. 11, a flow diagram showing a method for providing an appropriate alternate receiver to perform one or more input events in an IOT environment when receiver is unable to provide a satisfactory response is disclosed. The IOT hub (800) performs operation 1120 through operation 1140 similarly with operation 108 through operation 110 describing in the FIG. 1 of the disclosure.

Embodiments of the disclosure can also be embodied as a storage medium including instructions executable by a computer such as a program module executed by the computer. A computer readable medium can be any available medium which can be accessed by the computer and includes all volatile/non-volatile and removable/non-removable media.

Further, the computer readable medium may include all computer storage and communication media. The computer storage medium includes all volatile/non-volatile and removable/non-removable media embodied by a certain method or technology for storing information such as computer readable instruction code, a data structure, a program module or other data. Communication media may typically include computer readable instructions, data structures, or other data in a modulated data signal, such as program modules. In addition, computer-readable storage media may be provided in the form of non-transitory storage media.

The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as memory of a manufacturer's server, a server of an application store, or a relay server, or may be temporarily generated.

It has thus been seen that the system and method for providing an appropriate alternate receiver to perform the one or more input events in the IOT environment according to the disclosure achieve the purposes highlighted earlier. Such a system and method can in any case undergo numerous modifications and variants, all of which are covered by the same innovative concept, moreover, all of the details can be replaced by technically equivalent elements. The scope of protection of the disclosure is therefore defined by the attached claims.

While the disclosure has been shown and described with reference to various embodiments thereof, it will be understood by those skilled in the art that various changes in form and details may be made therein without departing from the spirit and scope of the disclosure as defined by the appended claims and their equivalents.

In addition, computer-readable storage media may be provided in the form of non-transitory storage media. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

The specific examples provided to explain the embodiments according to the present disclosure are merely a combination of each standard, method, detail method, and operation, and the various embodiments described herein can be performed through a combination of at least two or more techniques among the various techniques described. In addition, at this time, it can be performed according to a method determined through a combination of one or at least two or more of the aforementioned techniques. For example, it may be possible to perform a combination of parts of the operation of one embodiment with parts of the operation of another embodiment.

What is claimed is:

1. A method in an internet of things (IOT) environment, the method comprising:

identifying, by an electronic device, an input event;

determining, by the electronic device, an essentiality of the input event;

classifying, by the electronic device, the input event;

determining, by the electronic device, an expected response for the input event;

determining, by the electronic device, a current availability of a primary receiver for responding to the input event;

predicting, by the electronic device, a response of the primary receiver to the input event, based on the current availability of the primary receiver with respect to the expected response; and in response to determining that the response of the primary receiver is unsatisfactory:

determining, by an IOT hub, a current availability of at least one alternate receiver for responding to the input event;

predicting, by the IOT hub, a response of each receiver of the at least one alternate receiver to the input event, based on the current availability of the at least one alternate receiver with respect to the expected response;

selecting, by the IOT hub, an alternate receiver from among the at least one alternate receiver based on a prediction score, the prediction score is calculated based on at least one of an affinity score, an interaction score, or a persona score; and transmitting, by the IOT hub, to the selected alternate receiver, information to respond to the input event.

2. The method of claim 1, wherein the determining of the essentiality of the input event is based on one or more input event assessed parameters.

3. The method of claim 2, wherein the classifying of the input event is based on the one or more input event assessed parameters and metadata of the input event received from a service expected database.

4. The method of claim 3, wherein the determining of the expected response is based on at least one of:

the one or more input event assessed parameters, the metadata received from the service expected database, or a type of the input event.

5. The method of claim 1, wherein the determining of the current availability of the primary receiver and the at least one alternate receiver is based on at least one of:

a digital occupancy of each receiver, a physical occupancy of each receiver, or a readiness of IOT devices associated with each receiver.

6. The method of claim 1, further comprising:

providing, to the selected alternate receiver, encrypted text and essential information analyzed from one or more input event assessed parameters based on access rights of the selected alternate receiver.

7. The method of claim 6, wherein the encrypted text provided to the selected alternate receiver is determined based on the classification of the input event, wherein the essential information is analyzed from the one or more input event assessed parameters based on the expected response for performing the input event, and wherein the access rights of the alternate receiver are determined based on the prediction score.

8. The method of claim 6, wherein the encrypted text and the essential information are provided to the selected alternate receiver based on capability of a most suitable IOT device associated with the selected alternate receiver.

9. The method of claim 1, wherein the prediction score is calculated based on a defined percentage of the affinity score, a defined percentage of the interaction score, and a defined percentage of the persona score, and wherein the selected alternate receiver is determined as an alternate receiver having a highest prediction score among the at least one alternate receiver.

10. A system in an Internet of Things (IOT) environment, the system comprising:

memory storing one or more computer programs; and one or more processors communicatively coupled to the memory, wherein the one or more computer programs include computer-executable instructions that, when executed by the one or more processors individually or collectively, cause the system to:

identify an input event, determine essentiality of the input event, classify the input event, determine an expected response for the input event, determine a current availability of a primary receiver for responding to the input event, predict a response of the primary receiver to the input event, based on the current availability of the primary receiver with respect to the expected response, and in response to a determination that the response of the primary receiver is unsatisfactory:

determine a current availability of at least one alternate receiver for responding to the input event, predict a response of each receiver of the at least one alternate receiver to the input event, based on the current availability of the at least one alternate receiver with respect to the expected response, select an alternate receiver from among the at least one alternate receiver based on a prediction score, the prediction score is calculated based on at least one of an affinity score, an interaction score, or a persona score, and transmit, to the selected alternate receiver, information to respond to the input event.

11. The system of claim 10, wherein the one or more computer programs further include computer-executable instructions that, when executed by the one or more processors individually or collectively, cause the system to:

determine the essentiality of the input event based on one or more input event assessed parameters.

12. The electronic device system of claim 11, wherein the one or more computer programs further include computer-executable instructions that, when executed by the one or more processors individually or collectively, cause the system to:

classify the input event based on the one or more input event assessed parameters and metadata of the input event received from a service expected database.

13. The electronic device system of claim 12, wherein the one or more computer programs further include computer-executable instructions that, when executed by the one or more processors individually or collectively, cause the system to:

determine the expected response based on at least one of:

the one or more input event assessed parameters, the metadata received from the service expected database, or a type of the input event.

14. The electronic device system of claim 10, wherein the one or more computer programs further include computer-executable instructions that, when executed by the one or more processors individually or collectively, cause the system to:

determine the current availability of the receiver for the one or more input events based on at least one of:

a digital occupancy of each receiver, a physical occupancy of each receiver, or a readiness of IOT devices associated with each receiver.

15. The system of claim 10, wherein, the one or more computer programs further include computer-executable instructions that, when executed by the one or more processors individually or collectively, cause the system to:

provide, to the selected alternate receiver, encrypted text and essential information analyzed from one or more input event assessed parameters based on access rights of the selected alternate receiver.

16. The system of claim 15, wherein the encrypted text provided to the selected alternate receiver is determined based on the classification of the input event, wherein the essential information is analyzed from the one or more input event assessed parameters based on the expected response for performing the input event, and wherein the access rights of the alternate receiver are determined based on the prediction score.

17. The system of claim 15, wherein the encrypted text and the essential information are provided to the alternate receiver based on capability of most suitable IOT device associated with the selected alternate receiver.

18. The system of claim 10, wherein the prediction score is calculated based on a defined percentage of the affinity score, a defined percentage of the interaction score, and a defined percentage of the persona score, and wherein the selected alternate receiver is determined as an alternate receiver having a highest prediction score among the at least one alternate receiver.

19. An Internet of Things (IOT) hub for providing an alternate receiver to perform one or more input events in an IOT environment, the IOT hub comprising:

memory storing one or more computer programs; and one or more processors communicatively coupled to the memory, wherein the one or more computer programs include computer-executable instructions that, when executed by the one or more processors individually or collectively, cause the IOT hub to:

receive, from an electronic device, information associated with: essentiality of an input event, classification of the input event, an expected response for the input event, a current availability of a primary receiver for the input event, and a predicted response of the primary receiver to the input event, and in case that the predicted response of the primary receiver is predicted as unsatisfactory:

predict a response of at least one alternate receiver to the input event, based on the current availability of the at least one alternate receiver with respect to the expected response, select an alternate receiver from among the at least one alternate receiver based on a prediction score, the prediction score is calculated based on at least one of an affinity score, an interaction score, or a persona score, and transmit, to the selected alternate receiver, encrypted text and essential information analyzed from one or more input event assessed parameters, based on access rights of the selected alternate receiver.

20. One or more non-transitory computer-readable storage media storing one or more computer programs including computer-executable instructions that, when executed by one or more processors of a system individually or collectively, cause the system to perform operations, the operations comprising:

identifying, by an electronic device, an input event;

determining, by the electronic device, an essentiality of the input event;

classifying, by the electronic device, the input event;

determining, by the electronic device, an expected response for the input event;

determining, by the electronic device, a current availability of a primary receiver for responding to the input event;

predicting, by the electronic device, a response of the primary receiver to the input event, based on the current availability of the primary receiver with respect to the expected response; and in response to determining that the response of the primary receiver is unsatisfactory:

determining, by an IOT hub, a current availability of at least one alternate receiver for responding to the input event;

predicting, by the IOT hub, a response of each receiver of the at least one alternate receiver to the input event, based on the current availability of the at least one alternate receiver with respect to the expected response;

selecting, by the IOT hub, an alternate receiver from among the at least one alternate receiver based on a prediction score, the prediction score is calculated based on at least one of an affinity score, an interaction score, or a persona score; and transmitting, by the IOT hub, to the selected alternate receiver, information to respond to the input event.

* * * * *